United States Patent
Sanders

(10) Patent No.: US 10,012,810 B2
(45) Date of Patent: Jul. 3, 2018

(54) DOUBLE HELIX COOLANT PATH FOR HIGH POWER FIBER CONNECTOR

(71) Applicant: nLIGHT, INC., Vancouver, WA (US)

(72) Inventor: Walter R Sanders, Vancouver, WA (US)

(73) Assignee: nLIGHT, Inc., Vancouver, WA (US)

( * ) Notice: Subject to any disclaimer, the term of this patent is extended or adjusted under 35 U.S.C. 154(b) by 0 days.

(21) Appl. No.: 15/594,494

(22) Filed: May 12, 2017

(65) Prior Publication Data

US 2017/0329092 A1    Nov. 16, 2017

Related U.S. Application Data

(60) Provisional application No. 62/335,947, filed on May 13, 2016.

(51) Int. Cl.
   *G02B 6/36* (2006.01)
   *G02B 6/42* (2006.01)

(52) U.S. Cl.
   CPC ......... *G02B 6/4268* (2013.01); *G02B 6/4251* (2013.01)

(58) Field of Classification Search
   CPC ................ G02B 6/4268; G02B 6/4266
   See application file for complete search history.

(56) References Cited

U.S. PATENT DOCUMENTS

| | | | | |
|---|---|---|---|---|
| 3,267,664 A * | 8/1966 | Jones | F02K 9/64 | 60/204 |
| 3,409,074 A * | 11/1968 | Lacroix | F22B 1/1838 | 122/7 R |
| 3,821,510 A * | 6/1974 | Muncheryan | A61B 18/22 | 219/121.79 |
| 4,519,390 A * | 5/1985 | Horne | A61B 18/24 | 606/15 |
| 4,592,353 A * | 6/1986 | Daikuzono | A61B 18/24 | 219/121.6 |
| 4,760,845 A * | 8/1988 | Kovalcheck | A61B 18/28 | 606/28 |
| 4,899,741 A * | 2/1990 | Bentley | A61B 18/28 | 374/141 |
| 5,221,045 A * | 6/1993 | McAninch | B23P 15/008 | 239/1 |
| 5,381,497 A | 1/1995 | Toland et al. | | |
| 5,619,602 A * | 4/1997 | Sandstrom | G02B 6/3813 | 385/126 |
| 5,827,267 A * | 10/1998 | Savage | G02B 6/3814 | 606/14 |
| 7,079,747 B1 * | 7/2006 | Gagnon | G02B 6/02204 | 385/12 |

(Continued)

FOREIGN PATENT DOCUMENTS

DE    102005020109 A1    10/2006
DE    102009025556 A1    12/2010

OTHER PUBLICATIONS

International Search Report and Written Opinion for PCT/US2017/032553, dated Jul. 19, 2017, 9 pages.

*Primary Examiner* — Rhonda Peace

(57) ABSTRACT

A fiber connector, comprising a housing having a chamber extending in a lengthwise direction from a first end configured to receive a fiber to a second end configured to connect the fiber to a laser processing head and a channel disposed on an exterior surface of the chamber, the channel comprising a double helical structure.

13 Claims, 6 Drawing Sheets

(56) References Cited

U.S. PATENT DOCUMENTS

| | | | |
|---|---|---|---|
| 7,186,084 B2 | 3/2007 | Bunker et al. | |
| 7,314,317 B2 | 1/2008 | Hamasaki et al. | |
| 8,137,004 B2 | 3/2012 | Berger | |
| 8,501,060 B2 | 8/2013 | Johnson | |
| 8,764,316 B1 * | 7/2014 | Barnette | G02B 6/3869 385/76 |
| 8,945,106 B2 * | 2/2015 | Arless | A61B 18/02 606/20 |
| 9,134,171 B2 | 9/2015 | Blomster et al. | |
| 2002/0056279 A1 * | 5/2002 | Hara | B23Q 11/127 62/62 |
| 2007/0151101 A1 * | 7/2007 | Cocchi | A23G 9/22 29/890.03 |
| 2011/0146967 A1 * | 6/2011 | Winslow | E21B 47/011 166/57 |
| 2015/0107306 A1 * | 4/2015 | Goller | C03B 5/04 65/135.1 |
| 2015/0300745 A1 * | 10/2015 | Kolb | F28F 13/12 165/156 |
| 2017/0329092 A1 * | 11/2017 | Sanders | G02B 6/4251 |

* cited by examiner

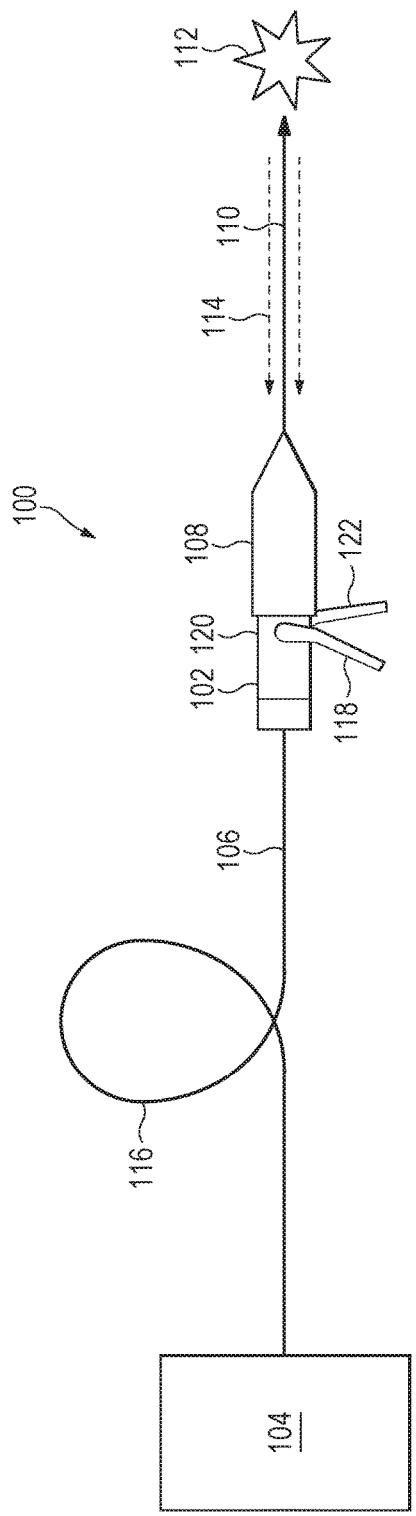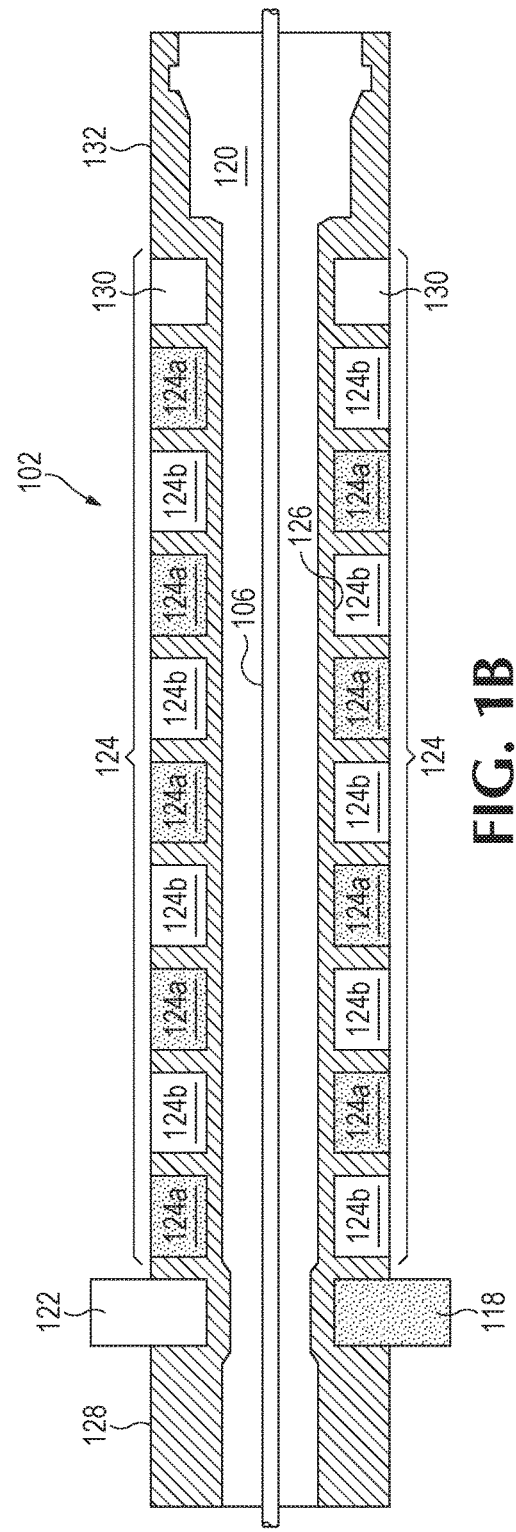
FIG. 1A
FIG. 1B

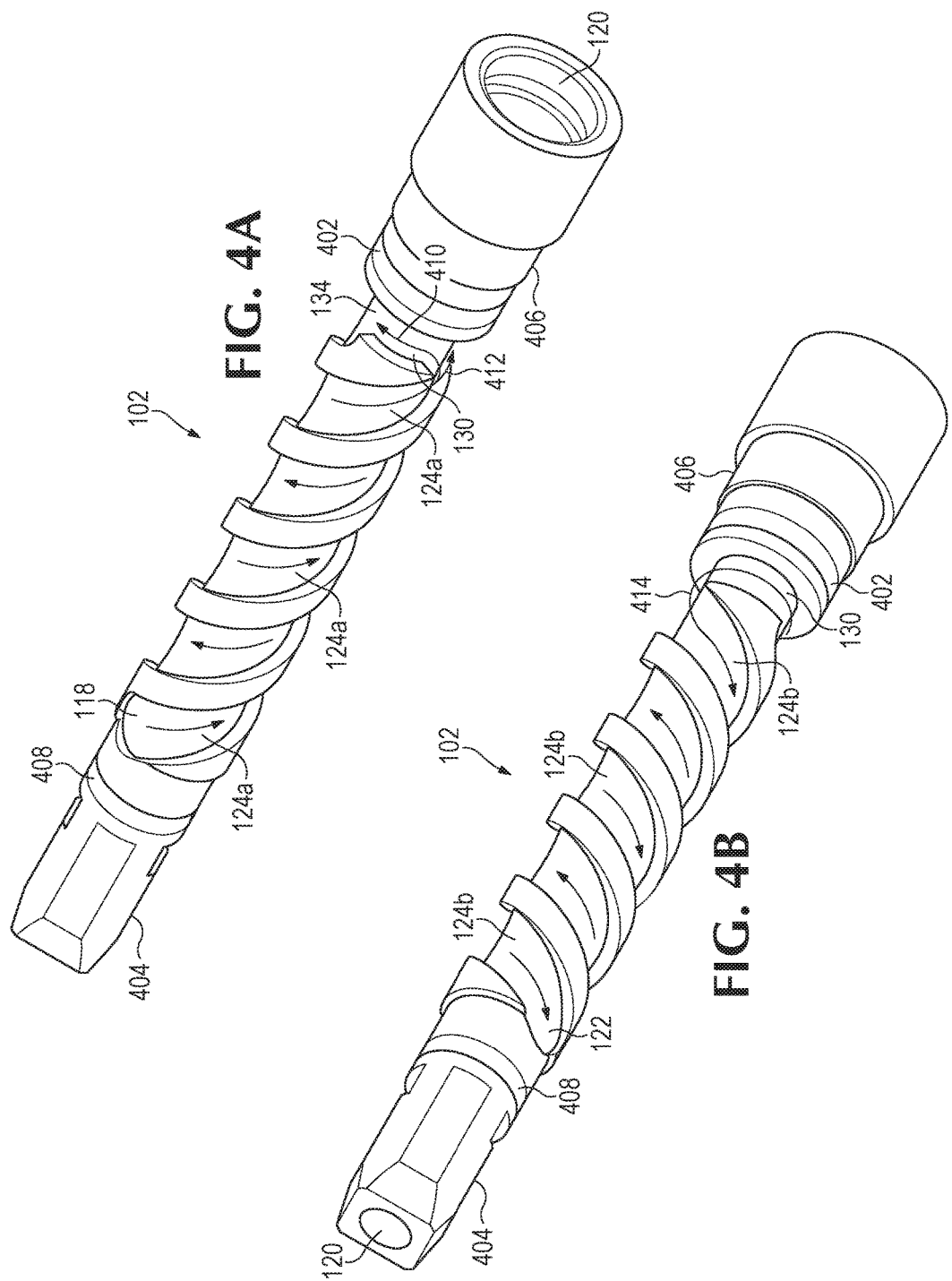

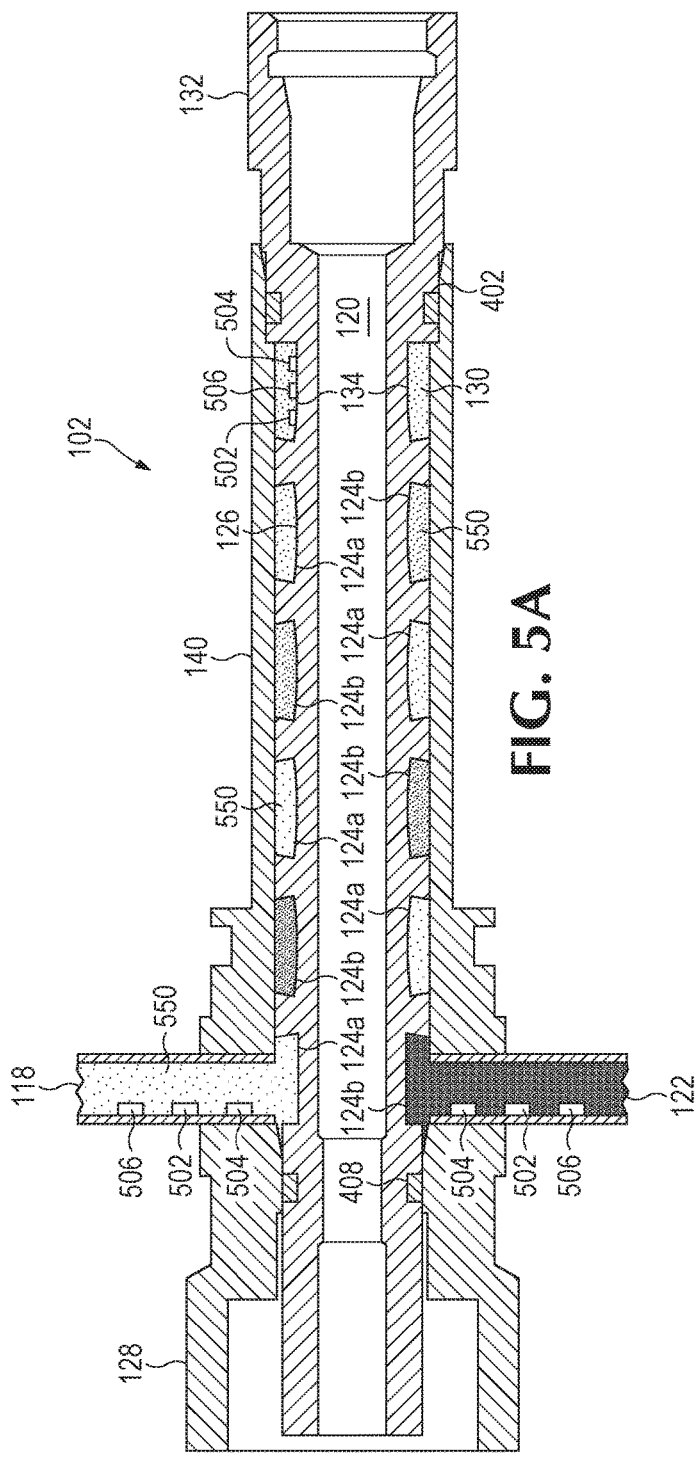
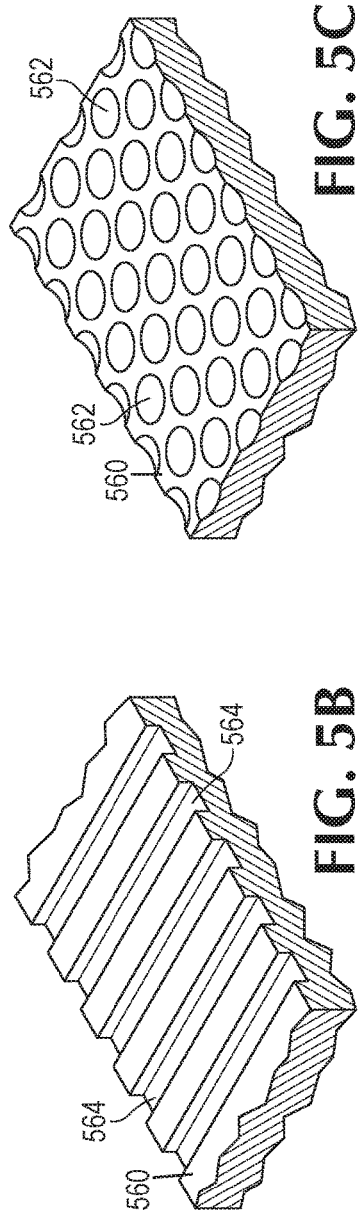
FIG. 5A
FIG. 5B
FIG. 5C

DOUBLE HELIX COOLANT PATH FOR HIGH POWER FIBER CONNECTOR

TECHNICAL FIELD

The technology disclosed herein relates to high-power fiber lasers. More particularly, the disclosed technology relates to heat dissipation in an optical fiber connector.

BACKGROUND

The use of high-power fiber lasers is increasing in popularity for a variety of applications such as material processing, cutting, welding and/or additive manufacturing. Optical power can be delivered from the laser source to an application system configured to transmit the optical power to a workpiece. In a typical fiber laser setup, pump light is launched into a fiber and emitted from a terminating end of the fiber onto a workpiece. Optical power can be coupled from an output fiber at the laser source to an input fiber on the application system. For many applications, it is convenient to have a fiber connector to enable a non-permanent connection between terminating ends of coupled fibers. Fiber connectors are typically designed to precisely align coupled fibers minimizing power losses and facilitating multiple connection/disconnection cycles.

A fiber connector is typically designed to dissipate uncontrolled or unguided optical power at or near the terminating ends of the coupled fibers. Some uncontrolled optical power may enter the cladding of the fiber. Existing connectors strip the power or attempt to retain it in the cladding of the fiber. Stripping optical power can be achieved by a variety of methods such as by using a polymer outer cladding, adding a grating to a cladding layer in the fiber, bending or tapering the fiber, use of a fiber Bragg grating and etc. Removal of unwanted light generates heat in the connector that should be dissipated. Stripping the back-reflected power is limited by the capability of the connector to dissipate the resultant heat. The fiber connector should be configured to efficiently dissipate uncontrolled power.

SUMMARY

A cooling system for a fiber laser connector is disclosed wherein cooling is provided by an aqueous coolant flow through an internal channel within the connector body. In this case the channel is formed by a double helix path machined into the inner body (core) of the connector structure. The channels are configured such that the inlet coolant flow is directed in a spiral around the core to the front of the connector and then returns in an identical spiral path to the back of the connector where it exits to be re-circulated by the external cooling system.

Disclosed herein is a fiber connector, comprising a housing having a chamber extending in a lengthwise direction from a first end configured to receive a fiber to a second end configured to connect the fiber to a laser processing head and a channel disposed on an exterior surface of the chamber, the channel comprising a double helical structure. The chamber can comprise any of a variety of materials, such as: Cu, Ag, Al, Au, and/or Pt, doped Si, or graphite or any combinations thereof. The fiber connector may include a channel comprises that comprises an inflow helical channel connected by a return structure to an outflow helical channel, wherein the inflow helical channel and the outflow helical channel are disposed adjacent to one another and wherein the return structure is configured to change a direction the coolant fluid is flowing by up to about 180.0 degrees. The return structure can be any of a variety of structures such as: a bifurcated annular channel connecting the inflow helical channel and the outflow helical channel and/or a u-bend channel connecting the inflow helical channel and the outflow helical channel. The channel can be further configured to circulate coolant fluid around the circumference of the chamber in a first flow direction through the inflow helical channel and in a second flow direction through the outflow helical channel. The coolant fluid can be any of a variety of fluids such as: distilled water, deionized water, ethylene glycol, propylene glycol, mineral oil, silicone oil, a halocarbon, molten metal, salts, liquefied gas, nanofluid, or the like or any combinations thereof. The first flow direction can be clockwise and the second flow direction can be counter-clockwise or vice versa. The fiber connector may have an inlet port coupled to the inflow helical channel configured to receive the coolant fluid and an outlet port coupled to the outflow helical channel configured to discharge the coolant fluid, wherein the inlet port receives the coolant fluid from a pump. The fiber connector can include one or more sensors disposed anywhere in the connector for example, in any of the inlet port, the outlet port, or the channel, or any combinations thereof. The sensor(s) can be any of a variety of sensor, for example: a thermal sensor, a pressure sensor or a photo sensor, or any combinations thereof. The sensor(s) can be configured to communicate sensor data to a pump controller configured to control the pump to dynamically change a pressure of the coolant fluid in the channel responsive to sensor data. The inside surface of the inflow helical channel or the outflow helical channel, or a combination thereof can be textured to increase surface area, wherein the texture is grooves or micro-dimples or a combination thereof.

BRIEF DESCRIPTION OF THE DRAWINGS

The accompanying drawings, wherein like reference numerals represent like elements, are incorporated in and constitute a part of this specification and, together with the description, explain the advantages and principles of the presently disclosed technology. In the drawings, FIG. 1A illustrates an example high-power fiber laser system including a fiber connector comprising double-helical channels for fluid cooling;

FIG. 1B is a cross-sectional view illustrating an example fiber connector comprising double-helical channels for fluid cooling;

FIG. 4A is perspective view of an example fiber connector comprising double-helical channels for fluid cooling;

FIG. 4B is perspective view of an example fiber connector comprising double-helical channels for fluid cooling;

FIG. 5A is a cutaway view of connector comprising double-helical channels for fluid cooling;

FIG. 5B depicts an example texture on an inside surface of a double-helical channel for fluid cooling in a fiber connector;

FIG. 5C depicts an example texture on an inside surface of a double-helical channel for fluid cooling in a fiber connector.

DETAILED DESCRIPTION

Figure 2:
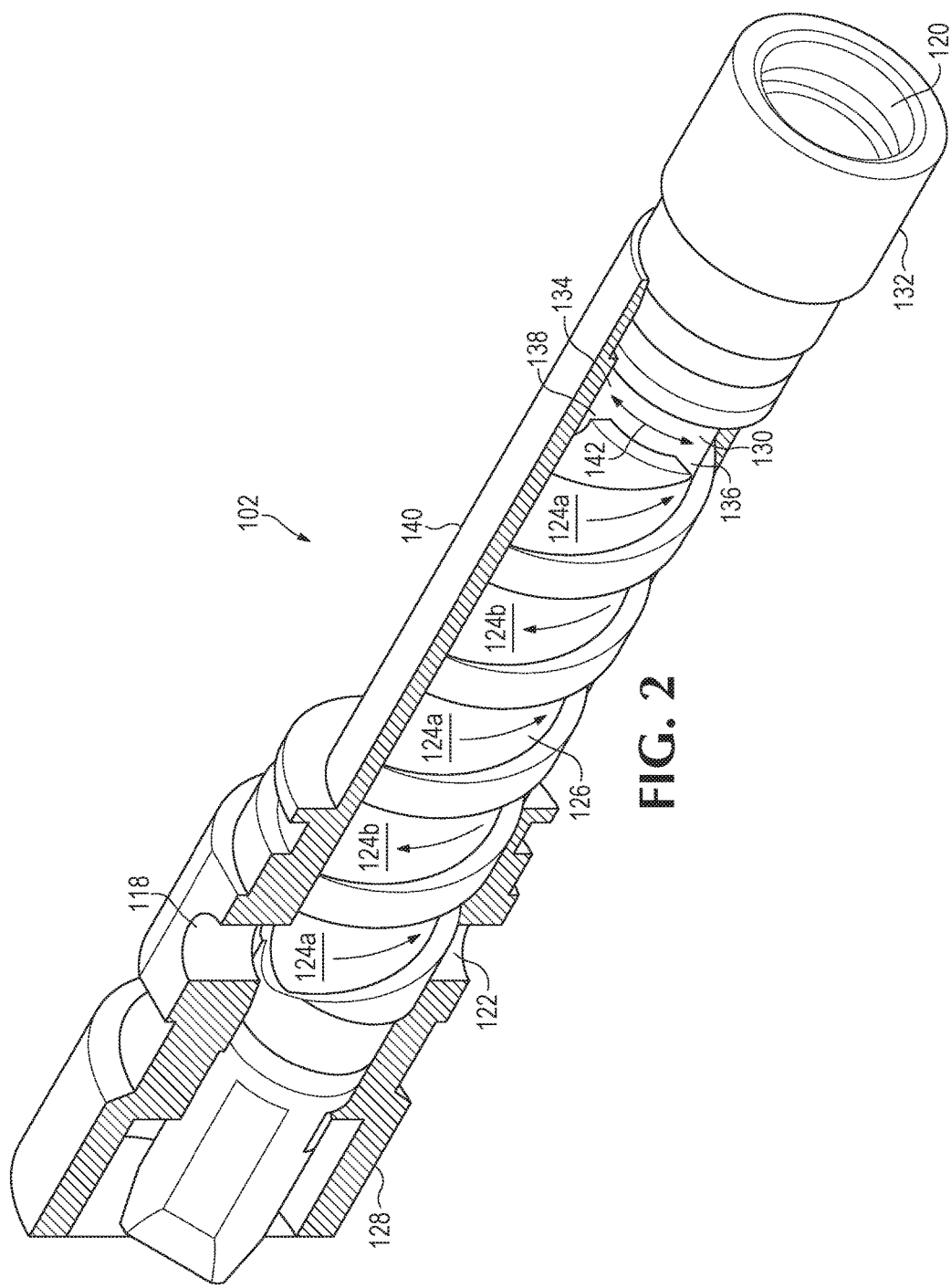
FIG. 2 is a cutaway perspective view illustrating an example fiber connector comprising double-helical channels for fluid cooling.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections. Examples are described with reference to directions indicated as "above," "below," "upper," "lower," and the like. These terms are used for convenient description, but do not imply any particular spatial orientation.

FIG. 1A illustrates an example high-power fiber laser system 100 including a fiber connector 102 comprising double-helical channels for fluid cooling. In an example, laser pump module 104 generates optical power that is then launches into optical fiber 106. Fiber 106 transmits the optical power to processing head 108 which is configured to direct beam 110 out of the fiber onto a workpiece 112 for processing. Processing head 108 may be operable to execute a variety of material processing actions such as welding, cutting, brazing, ablating, or the like or any combinations thereof.

Uncontrolled optical power can arise in laser system 100 for a variety of reasons. This uncontrolled optical power, especially in high-power laser systems, can generate significant heat and can cause damage at various places in the system. Thus, uncontrolled optical power is highly undesirable and must be efficiently managed in order to prevent damage. Some of the sources of uncontrolled optical power present in laser systems such as system 100 are back-reflection, misalignment at the fiber-to-fiber interface, irregularities in the fibers and/or other non-linear effects.

Back-reflection tends to be a significant source of uncontrolled optical power in a laser system. Back-reflection can occur at misaligned fiber interfaces and/or where optical power is reflected back into an output fiber from a workpiece or other features of the environment outside of the laser system. Back-reflected light 114 in system 100 enters processing head 108, for example, by coupling into the core or cladding of fiber 106. Poorly guided back-reflected light 114 will tend to leak out of the cladding of fiber 106 in processing head 108, connector 102, at fiber bend 116 and/or where there are irregularities or discontinuities in the fiber 106. As back-reflected light 114 escapes from fiber 106 it discharges as heat and can cause thermal damage and failures in the fiber 106 at the points where it escapes.

In an example, connector 102 includes a fluid cooled chamber 120 configured to dissipate heat generated by escaping optical power. Fluid cooled chamber 120 comprises inlet 118 and outlet 122 to input and return fluid through double helical fluid channels that guide the fluid along an exterior surface of chamber 120. Chamber 120 may be made of a variety of materials. In an example, chamber 120 is formed from thermally conductive materials such as Cu, Ag, Al, Au, and/or Pt, doped Si, graphite or the like or any combinations thereof. The helical channels may be machined, etched or otherwise formed on an outer surface of chamber 120. Fluid used to cool chamber 120 can comprise any of a variety of coolants including any of a variety of heat transfer fluids such as: distilled water, $CO_2$, Nitrogen, air, deionized water, ethylene glycol, propylene glycol, various oils (e.g., mineral oil and silicone oil), refrigerants (e.g., e.g., halocarbons), molten metal, salts, liquefied gases, nanofluids, and/or the like or any combinations thereof.

FIG. 1B is a cross-sectional view illustrating an example fiber connector 102 comprising fluid-cooled chamber 120 configured to dissipate heat generated by optical power escaping from fiber 106. Channels 124 circulate fluid around the circumference of heat transfer surface 126 of fluid-cooled chamber 120. Chamber 120 extends in a lengthwise direction from a first end 128 to a second end 132 of connector 102. First end 128 is configured to receive a fiber 106. Second end 132 is configured to connect fiber 106 to a laser processing head.

In an example, channels 124 are disposed on an exterior surface 126 of chamber 120. Channels 124 have a double helical structure (see FIG. 2) including an inflow helical channel 124a and outflow helical channel 124b that are connected by a return structure 130 configured to change the direction of fluid flowing in through inflow helical channel 124a. In an example, fluid may enter inflow helical channel 124a from inlet 118 to circulate in a first direction around the circumference of heat transfer surface 126 of chamber 120 whereupon exiting inflow channel 124a return structure 130 changes the direction of the fluid flow. Return structure 130 redirects fluid flow to outflow helical channel 124b to circulate in a second direction around the circumference of heat transfer surface 126 of chamber 120. The fluid returns to outlet port 122 via outflow helical channel 124b. In this way fluid flowing in channel 124 is in contact with heat transfer surface 126 for an extended period of time over conventional liquid-cooled fiber connector systems increasing the fluid's ability to absorb thermal energy and carry thermal energy away from chamber 120. The first direction can be clockwise and the second direction can be counter-clockwise and vice versa. Channel 124 may be manufactured by a variety of methods including machining, 3D printing, lithography and/or etching.

FIG. 2 is a cutaway perspective view illustrating an example fiber connector 102 comprising fluid-cooled chamber 120 and double-helical channels for fluid cooling. In an example, inlet port 118 and outlet port 122 are disposed proximate first end 128 and wherein the inlet port 118 is configured to receive the fluid and the outlet port 122 is configured to discharge the fluid. Fluid enters inflow channel 124a via inlet 118 and flows toward second end 132 along the length of connector 102 around the circumference of heat transfer surface 126 in a counter-clockwise direction as indicated by the arrows adjacent to the element numbers "124a" for inflow channels. The fluid exits inflow channel 124a where it reaches fluid return structure 130. Fluid return structure 130 is configured to change the direction the fluid flows in inflow channel 124a by about 180 degrees before the fluid is fed to outflow channel 124b. After return structure 130 reverses the direction of the fluid, it is routed into outflow channel 124b where it flows toward first end 128 along the length of connector 102 around the circumference of heat transfer surface 126 in a clockwise direction as indicated by the dotted arrows. The fluid exits connector 102 via outlet 122.

Fluid return structure 130 can be configured in a variety of ways. In one example, return structure 130 is bifurcated forming an annular channel 134 disposed around a circumference of heat transfer surface 126 proximate the second end 132 of connector 102. Annular channel 134 has a first opening 136 to receive fluid from inflow channel 124a and a second opening 138 configured to discharge fluid from annular channel 134 into outflow channel 124b. Fluid flowing from inflow channel 124a into annular channel 134 may exit inflow channel 124a through first opening 136 to flow in either a clockwise or counter-clockwise direction as indicated by arrow 142. The portion of the fluid that flows around annular channel 134 in each direction (clockwise or counter-clockwise) will be determined by a pressure drop in the direction of flow. For example, if the pressure drop in the clockwise direction is greater than the pressure drop in the counter-clockwise direction a higher percentage of the fluid will flow in the counter-clockwise direction. Fluid will flow in both directions in proportion to the pressure drop in the direction of flow.

In other examples, return structure 130 can be a conduit connecting an output portion of inflow channel 124a with an input portion of outflow channel 124b. Return structure 130 may be a simple u-bend channel, a connecting channel disposed on heat transfer surface 126 that connects channel 124a and channel 124b and that does not extend around the circumference of connector 102 and/or the like. Many other varieties of return structures may now occur to those of skill in the art and are within the scope of the claimed invention.

Figure 3:
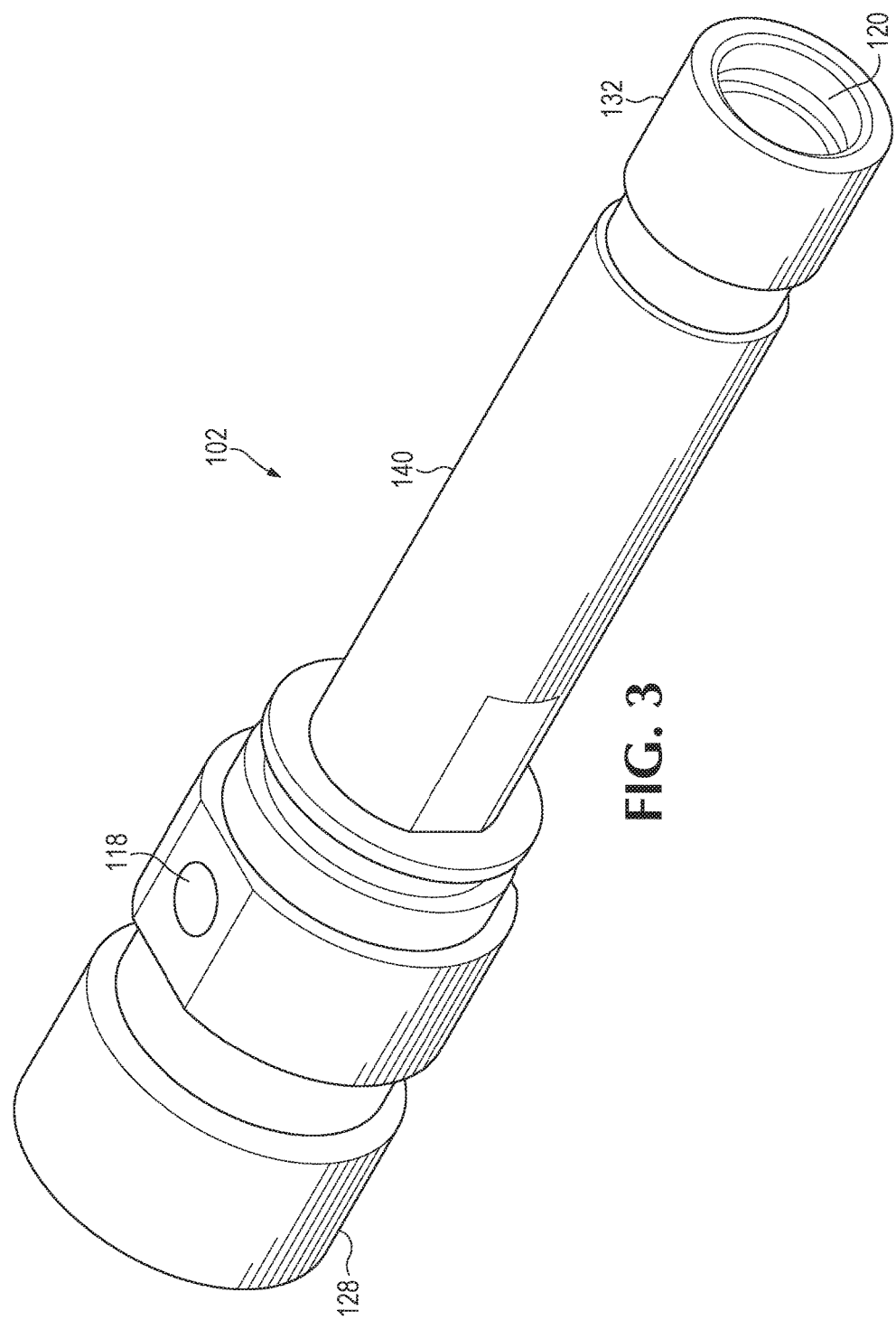
FIG. 3 is a perspective view illustrating an example fiber connector comprising double-helical channels for fluid cooling.

FIG. 3 is a perspective view illustrating an example fiber connector 102 comprising fluid-cooled chamber 120 and double-helical channels for fluid cooling. Casing 140 extends longitudinally from first end 128 to second end 132 of connector 102 covering inflow channel 124a, outflow channel 124b and/or annular channel 134. Casing 140 may create a seal with channel 124a, channel 124b and/or channel 134. The seal with casing 140 may be of varying strengths, letting little to no fluid from one channel leak out into another channel.

FIGS. 4A and 4B are opposing perspective views of an example fiber connector 102 comprising fluid-cooled chamber 120 and double-helical channels for fluid cooling. FIG. 4A is shown from the side of connector 102 where fluid enters inflow channel 124a at inlet 118. FIG. 4B is shown from the side of connector 102 where fluid exits outflow channel 124b at outlet 122. Further, as depicted in both FIGS. 4A and 4B, a first O-ring seal 402 and second O-ring seal 408 are disposed on opposite ends of connector 102 and are configured to seal coolant fluid in inflow channel 124a, outflow channel 124b and/or annular channel 134. O-rings 402 and 408 may create a seal with casing 140 (see FIG. 3). O-rings 402 and 408 are positioned to help prevent the coolant fluid from coming into contact with other components of connector 102 such as thermal switch 404 and end cap 406. Escaping fluid may cause thermal, electrical and/or mechanical damage.

Referring now to FIG. 4A, fluid enters connector 102 via inlet port 118. An external cooling system comprising a pump injects fluid into connector 102. As indicated by arrows 410 and 412, fluid flows through inflow channels 124a to return structure 130. The fluid flows in a clockwise and counter-clockwise direction in annular channel 134, depending on the pressure drop in either direction, and enters outflow channel 124b.

In FIG. 4B, as indicated by arrow 414, fluid flows from inflow channels 124a around return structure 130 and back into outflow channel 124b. Fluid exits channel 124b via outlet 122 where it can be collected and recycled by an external cooling system.

FIG. 5A is a cutaway view of connector 102 with double-helical channels for fluid cooling. To prevent leaking and/or thermal/mechanical damage to connector 102, connector 102 can include various sensors located throughout to detect escaping fluid, thermal fluctuation, unexpected backscattered light or other irregularities. For example, sensors such as thermal sensors 502, pressure sensors 504 and/or other sensors 506 that may occur to persons of skill in the art can be disposed in inlet 118, outlet 122, channel 124a, channel 124b and/or channel 134 to detect temperature, pressure and/or other physical phenomena related to the fluid flowing in connector 102. Such sensors can be configured to provide information generated about the physical environment within connector 102 to an external cooling system including a pump (see FIG. 6). Other sensors such as photodiodes may be placed in various other locations in connector 102 to feedback sensor data to the external cooling system to be used to control the function of the pump and/or other components of the cooling system.

As the fluid flows from inlet 118 into channel 124a then to channel 134 and finally out via channel 124b heat is transferred from heat transfer surface 126 to fluid 550. In FIG. 5, the shading pattern of fluid 550 is made denser as fluid 550 travels from inlet 118 to outlet 122 to show a gradual increase in temperature as heat is transferred from heat transfer surface 126 to fluid 550.

The "thermal capacity," which measures the ability of the coolant fluid to remove heat from external heat transfer surface 126, is determined by a variety of factors including the specific thermal capacity of the fluid and the mass flow rate. Changing the pressure of fluid 550 in channels 124a, 124b and 134 will change mass flow and thus the thermal capacity of fluid 550 (e.g., increasing fluid pressure increases thermal load of the fluid). Furthermore, the greater the surface area in contact with fluid 550 the more heat can be transferred from heat transfer surface 126 to fluid 550.

Thus, increasing surface area in contact with fluid 550 can increase the heat transfer capability of the device such as connector 102.

In an example, the pressure in channels 124a, 124b and 134 may be dynamically adjusted to adapt the thermal load of fluid 550 to accommodate the real-time thermal output of heat transfer surface 126. Adjusting the pressure of fluid 550 dynamically and/or in real-time may enable connector 102 to mitigate changes in the thermal output of the heat transfer surface 126, the pressure of fluid 550, presence of unexpected backscattered light and/or other irregularities in fiber connector 102.

Sensors such as 502, 504 and 506 may be placed in various locations within connector 102 to generate sensor data about the temperature and pressure (or other physical phenomena) in channels 124a, 124b and 134. The light, temperature and pressure data may be communicated wirelessly or via wireline to one or more controllers, such as, a pump controller (and/or driver) configured to adjust pump flow to connector 102 and to thereby modify the pressure inside channels 124a, 124b and/or 134.

In an example, the pressure may be manually adjusted to customize the pressure to suit various applications. Manual adjustment of fluid pressure enables a single connector to be used in a variety of circumstances on a variety of materials because the thermal output of the heat transfer surface 126 may vary between applications for a variety of reasons.

In an example, the heat transfer capacity of channels 124a, 124b and/or 134 can be optimized by customizing the dimensions of the channels 124a, 124b and/or 134 such as depth, width, and/or pitch to maximize the amount of surface area in contact with the coolant fluid for a particular application. Furthermore, the surface texture of the inner surface of channels 124a, 124b and/or 134 may be modified to increase surface area in contact with a coolant fluid. For example, adding grooves 564, micro-dimples 562, or other texture to the surface area of channels 124a, 124b and/or 134 can increase surface area in contact with fluid 550 and may improve heat dissipation from heat transfer surface 126. FIG. 5B depicts an example grooved texture on an inside surface 560 of channels 124a, 124b and/or 134. FIG. 5C depicts an example dimpled texture on inside surface 560 of channels 124a, 124b and/or 134.

Figure 6:
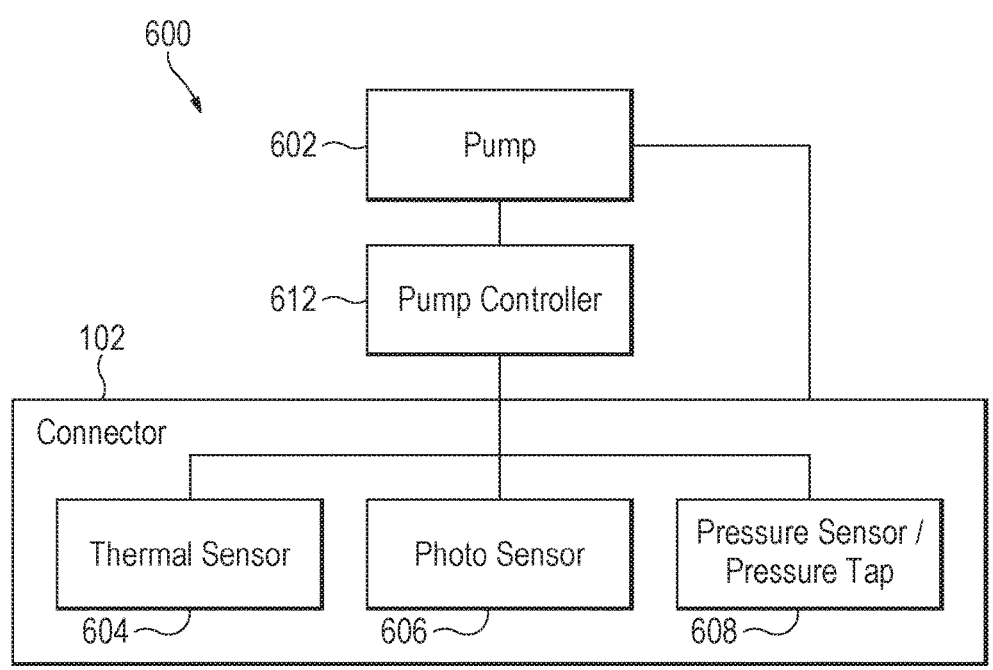
FIG. 6 is a block diagram illustrating a feedback system 600 for a fiber laser connector 102 with double-helical channels for liquid cooling.

FIG. 6 is a block diagram illustrating a feedback system 600 for a fiber laser connector 102 with double-helical channels for liquid cooling. As described above with respect to FIG. 5, an example connector 102 has one or more sensors such as a thermal sensor 604, photo sensor 606 and/or pressure sensor 608 embedded in chamber 120, channels 124a, 124b and/or 134, and/or in other connector 102 locations (see FIG. 5). Any of sensors 604-608 can generate and send data based on the detection of physical phenomena (e.g., temperature, pressure and/or light) to a pump controller 602.

In other examples, sensors other than or in addition to thermal sensor 604, photo sensor 606 and/or pressure sensor 608 may be used. Sensors may be used in high-power fiber laser system 100 (see FIG. 1) in connection with the above described feedback system 600 or to serve another function such as to send control data to other controlling devices associated with high-power fiber laser system 100. Such other sensors may be chemical, flow, accelerometer, motion, moisture, vibration, sound and the like or any combinations thereof.

Having described and illustrated the general and specific principles of examples of the presently disclosed technology, it should be apparent that the examples may be modified in arrangement and detail without departing from such principles. We claim all modifications and variation coming within the spirit and scope of the following claims.

The invention claimed is:
1. A fiber connector, comprising:
a housing having a chamber extending in a lengthwise direction from a first end configured to receive a fiber to a second end configured to connect the fiber to a laser processing head; and
a channel disposed on an exterior surface of the chamber, the channel comprising a double helical structure, wherein the channel comprises a inflow helical channel connected by a return structure to an outflow helical channel, wherein the inflow helical channel and the outflow helical channel are disposed adjacent to one another, wherein the return structure is a bifurcated annular channel connecting the inflow helical channel and the outflow helical channel and wherein the annular channel extends around a full circumference of the exterior surface of the chamber.

2. The fiber connector of claim 1, wherein the channel is further configured to circulate coolant fluid around the circumference of the chamber in a first flow direction through the inflow helical channel and in a second flow direction through the outflow helical channel.

3. The fiber connector of claim 2, wherein the first flow direction is clockwise and the second flow direction is counterclockwise.

4. The fiber connector of claim 2, further comprising an inlet port coupled to the inflow helical channel configured to receive the coolant fluid and an outlet port coupled to the outflow helical channel configured to discharge the coolant fluid.

5. The fiber connector of claim 4, wherein the inlet port receives the coolant fluid from a pump.

6. The fiber connector of claim 5, further comprising a sensor disposed in the inlet port, the outlet port, or the channel, or any combination thereof.

7. The fiber connector of claim 6, wherein the sensor is a thermal sensor, a pressure sensor or a photo sensor, or any combination thereof.

8. The fiber connector of claim 6, wherein the sensor is configured to communicate sensor data to a pump controller configured to control the pump to dynamically change a pressure of the coolant fluid in the channel responsive to sensor data.

9. The fiber connector of claim 2, wherein the return structure is configured to change a direction the coolant fluid is flowing by up to about 180.0 degrees.

10. The fiber connector of claim 2, wherein the coolant fluid is distilled water, deionized water, ethylene glycol, propylene glycol, mineral oil, silicone oil, a halocarbon, molten metal, salts, liquefied gas, nanofluid, or any combination thereof.

11. The fiber connector of claim 1, wherein the chamber comprises Cu, Ag, Al, Au, Pt, doped Si, or graphite or any combination thereof.

12. The fiber connector of claim 1, wherein an inside surface of the inflow helical channel or the outflow helical channel, or a combination thereof is textured to increase surface area.

13. The fiber connector of claim 12, wherein the texture is grooves or micro-dimples or a combination thereof.

* * * * *